United States Patent
Kohl et al.

(10) Patent No.: US 6,877,296 B2
(45) Date of Patent: Apr. 12, 2005

(54) ISOLATED TARGETING OF PROBLEM AREAS IN HERMETIC SEALS

(75) Inventors: Garrett William Kohl, Allen, TX (US); Steven Kenneth Tucker, Hurst, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 10/200,952

(22) Filed: Jul. 22, 2002

(65) Prior Publication Data

US 2004/0011007 A1 Jan. 22, 2004

(51) Int. Cl.[7] .............................................. B65B 51/14
(52) U.S. Cl. ...................... 53/451; 53/370.7; 53/371.2; 53/373.7; 53/374.2
(58) Field of Search ................ 53/451, 557, 550, 53/370.7, 371.2, 375.9, 373.7, 374.2

(56) References Cited

U.S. PATENT DOCUMENTS

| | | | | |
|---|---|---|---|---|
| 2,589,756 A | * | 3/1952 | Waters | 100/325 |
| 2,627,893 A | * | 2/1953 | Williams | 156/582 |
| 3,200,557 A | * | 8/1965 | Schwenk | 53/477 |
| 4,768,326 A | * | 9/1988 | Kovacs | 53/374.8 |
| 5,015,223 A | * | 5/1991 | Boeckmann | 493/194 |
| 5,016,426 A | * | 5/1991 | Davis | 53/554 |
| 5,207,049 A | * | 5/1993 | Baruffato et al. | 53/373.7 |
| 5,279,098 A | * | 1/1994 | Fukuda | 53/451 |
| 5,868,901 A | * | 2/1999 | Smith | 156/582 |
| 5,890,347 A | * | 4/1999 | Giacomelli et al. | 53/477 |
| 5,992,131 A | * | 11/1999 | Iwano et al. | 53/451 |
| 6,230,781 B1 | | 5/2001 | Smith | |

OTHER PUBLICATIONS

U.S. Appl. No. 09/560,616, filed Apr. 28, 2000, Dierl et al.
U.S. Appl. No. 10/061,133, filed Jan. 31, 2002, Cooper et al.

\* cited by examiner

Primary Examiner—Scott A. Smith
Assistant Examiner—Gloria R. Weeks
(74) Attorney, Agent, or Firm—Colin P. Cahoon; Chad E. Walter; Carstens & Cahoon, LLP

(57) ABSTRACT

In order to reduce the percentage of leaks in sealed packages, the sealing jaws contain one or more raised regions that correspond to problem areas for leaks, i.e., adjacent to back seals and folds in the package design. The raised regions are raised approximately 4–20 mils above the regions that seal the normal two layers of material.

9 Claims, 9 Drawing Sheets

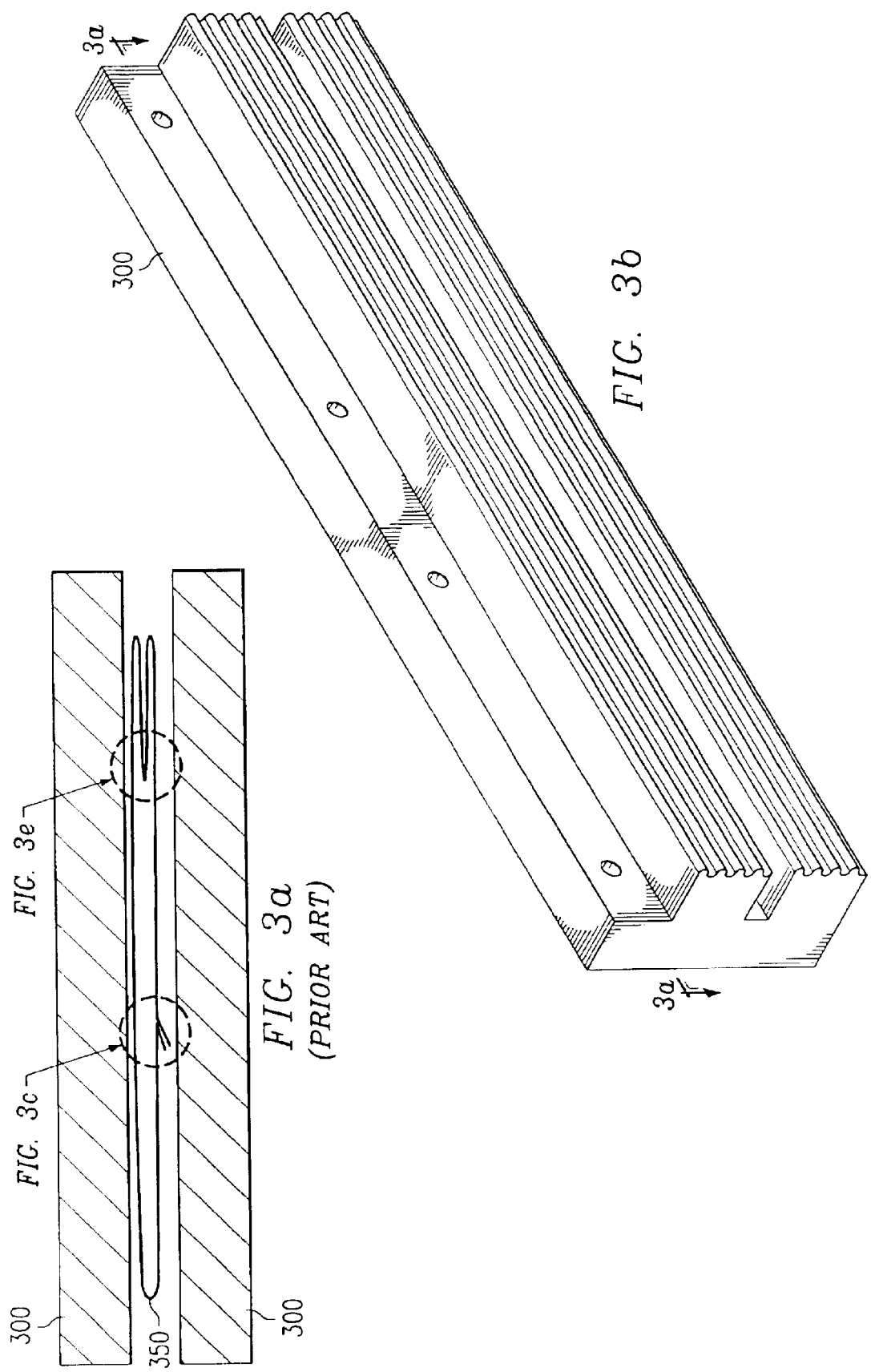

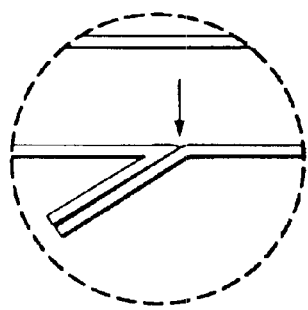
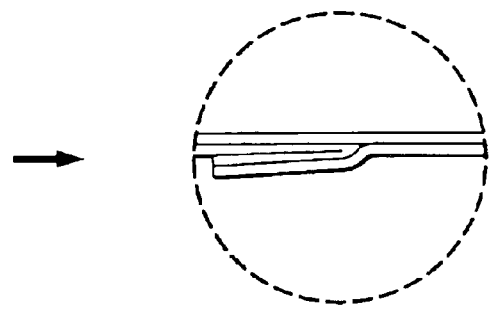
FIG. 3c          FIG. 3d
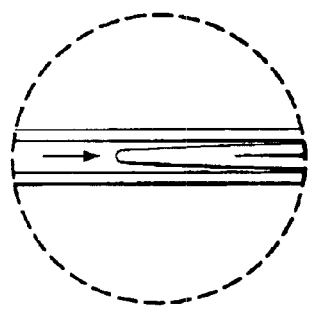
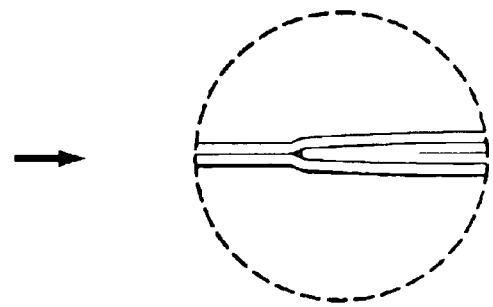
FIG. 3e          FIG. 3f
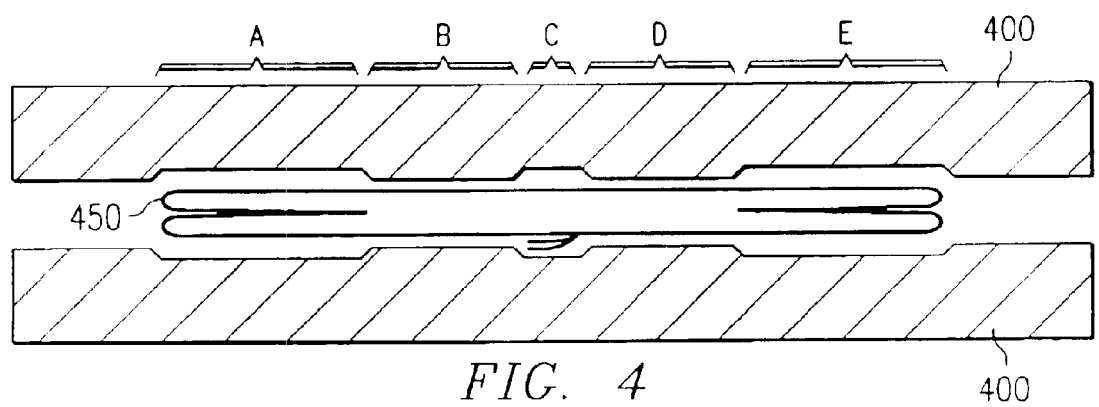
FIG. 4

ISOLATED TARGETING OF PROBLEM AREAS IN HERMETIC SEALS

BACKGROUND OF THE INVENTION

1. Technical Field

The present invention relates to packaging of a product in a heat-sealable pouch, and more particularly to producing a hermetic seal in portions of a heat-sealable pouch where adjoining areas have a variable number of layers of material.

2. Description of Related Art

POUCH PACKAGING

Many snack foods, like chips, pretzels, etc., are packaged in pouches formed of very thin packaging films. These pouches can be manufactured on vertical form, fill, and seal packaging machines that, as their name implies, forms a package, fills it with a product, and seals the filled package.

One such packaging machine is seen diagrammatically in FIG. 1. Packaging film 110 is taken from a roll 112 of film and passed through tensioners 114 that keep it taut. The film then passes over a former 116, which directs the firm into a vertical tube around a product delivery cylinder 118. As the tube is pulled downward by drive belts 120, the vertical tube of film is sealed along its length by a vertical sealer 122, forming a back seal 124. The machine then applies a pair of heat-sealing jaws 126 against the tube to form a transverse seal 128. This transverse seal 128 acts as the top seal on the bag 130 below the sealing jaws 126 and the bottom seal on the bag 132 being filled and formed above the jaws 126. After the transverse seal 128 has been formed, a cut is made across the sealed area to separate the finished bag 130 below the seal 128 from the partially completed bag 132 above the seal. The film tube is then pushed downward to draw out another package length. Before the sealing jaws form each transverse seal, the product to be packaged is dropped through the product delivery cylinder 118 and is held within the tube above the transverse seal 128.

FIG. 1c shows a sealing carriage on a prior art form, fill, and seal packaging machine. FIG. 1b is a cross-section of a prior art sealing assembly installed in the carriage. Opposed transverse seal facings 102, 104 are shown attached to opposed bridge assemblies 106, 108. Behind each seal facing 102, 104 is a heat probe 128, 130 capable of heating the exposed surface of the seal facings up to 450° F. during operation. Placed between the seal facings 102, 104 and their respective bridge assemblies 106, 108 is a heat separator 136, 138. The heat separators 136, 138 provide a thermal barrier between the seal facings 102, 104 and the bridge assembly 106, 108 in order to minimize heat transfer to the bridge assembly 106, 108 and other components attached thereto. A thermocouple or thermistor 132, 134 is placed between the heat separator 136, 138 and the heat probe 128, 130 in order to monitor the seal facing 102, 104 temperature. As previously described, a transverse seal is formed when a tube of film placed between the seal facings 102, 104 is flattened as the seal facings 102, 104 are brought in close proximity to each other. To accomplish this, both bridge assemblies 106, 108 move towards each other on stationary rods 110, 112.

Also shown attached to the bridge assemblies 106, 108 is a pair of opposed crumb plates 114, 116. When the bridge assemblies 106, 108 are brought together, the crumb plates 114, 116 slightly overlap, thereby forming a temporary "S" shaped constriction in the flattened film tube. This "S" shaped constriction provides a means for keeping product out of the transverse seal area while the tube of film above the constriction is filled with product. Two stripper bars 118, 120 are also shown attached to the bridge assemblies 106, 108. The stripper bars 118, 120 are typically spring loaded and provide the stripping function previously described.

Both of the seal facings 102, 104 are constructed with a central channel 141, 143 to accommodate a knife or cutting tool 122, best seen in FIG. 1c. This knife 122 is recessed within the channel 141 of one of the seal facings 102 and held in place by two knife brackets 124, 126 attached to the bridge assemblies 106, 108. After the transverse seal has been formed on the flattened film tube, the knife brackets 124, 126 are rotated slightly, thereby exposing the knife 122 to the transverse seal. This action cuts the transverse seal, thereby completing the process of forming, filling, and sealing a single package.

The prior art carriage described above is designed such that the seal facings 102, 104 can be removed in order to install another set of seal facings that provide for different vertical widths of the resultant transverse seals. The facing assembly shown in FIGS. 1b and 1c is aligned at the factory, and it is not recommended that the operator remove more than the seal facings 102, 104, crumb plates 114, 116, and stripper bars 118, 120 from the facing assembly. An enlarged perspective of one of the facings by itself can be seen in FIG. 3b.

There can be variations to the specific art described above. For instance, some machines do not require crumb plates and stripper bars, although other machines do. Additionally, in many packaging machines, the facing 102/104 is not a separate, replaceable part of the jaws, but is integral with the jaws.

There are three main parameters of the sealing mechanism that are typically changed to correct improper sealing of a bag: temperature, pressure, and dwell time (the time the seal jaws are closed to form the seal). The materials used generally seal within a given range of temperatures, such as 375–425°, although this range can vary, depending on the accompanying pressure and dwell time. Of these three variables, the pressure is generally set at the factory by a mechanic, and is not easily changeable. A typical pressure would be about 300 pounds of pressure across the entire facing, with the pressure generally fairly evenly distributed across the entire facing. Thus, for an eight-inch wide bag, there can be approximately eight square inches of packaging contacted when making the top/bottom seal, or a pressure of about 37.5 pounds per square inch for a seal that is ½ inch wide.

In contrast to the factory-set pressure, the temperature and dwell time are operator decisions at the time the product is packaged. The operator will generally be familiar with the specific materials being used for a package and can vary the time and temperature parameters as needed to obtain an effective seal, within the constraints of the situation. One such constraint is that increasing the temperature past a given range for a material can result in burning, or melting a hole through the material. An additional constraint is the effective throughput of a machine, which can be affected by the dwell time. For instance, if a seal formed at a given temperature and pressure is not holding after $\frac{1}{10}$ of a second, increasing the dwell time of the sealing mechanism to $\frac{1}{5}$ second, or even ½ second, may significantly improve the seal, but it may also mean that the machine can only package a fraction of the product it can handle at a lower dwell time. A dwell time that requires additional machines to meet a production schedule is not an economic solution.

A typical film used for packaging snack foods is seen in FIG. 2. The outermost layer 202 is an OPP, short for oriented polypropylene, while the innermost layer 206 is a metalized oriented polypropylene. An oriented polymer material has been specially treated so that the molecules tend to align in a given direction, causing the material to tend to preferentially tear in that direction. Sandwiched between the two OPP layers is a layer 204 of polyethylene that contains any printing on its outer surface. The innermost, metallic layer 206 can itself be a layered laminate and contains a sealant layer 208 on what will be the inside of the package. This sealant layer is composed of a ter-polymer, composed of ethylene, propylene, and butylene. The bag is sealed by bringing together two sections of the metallic layer, with their sealant layers together. When heat and pressure are applied through the jaws, the adjacent sealant layers melt together and form a seal. Other materials used in packaging are polyester, paper, polyolefin extrusions, adhesive laminates, and other such materials, or a layered combination of the above.

Ideally, every seal on every package would be hermetic, or leak-proof, even under pressure changes. This is especially important with snack foods, so that flavor and freshness are preserved. Areas where the package has a back seal, folds, or gussets provide extra layers of material in the seal, but this problem becomes more acute with thicker packaging materials, additional folds in the package design, and smaller packages. FIG. 3a shows a cross-section along the length of a pair of prior art crimperjaws 300 having a bag 350 that is about to be sealed between the jaws 300. In this drawing, the areas near the back seal and the gusset are enlarged to form FIGS. 3c and 3e respectively. In FIGS. 3d and 3f, each of these locations is then shown again after the seal has been made, with an arrow pointing to the small area where triangular capillary leaks tend to occur. As can be seen in these enlargements, the immediate areas where the number of layers changes is the most likely location for a leak. While it is probably impossible to totally eliminate leakers in the production line, the goal is always to achieve a vanishingly small number of them.

Co-pending patent application Ser. No. 10/061,133, filed Jan. 31, 2002, which is owned by the assignee of this application and has overlapping inventorship, deals with the problem of sealing a package having a large fold and a relatively thick packaging material, although in this application, a hermetic seal was not a primary concern. In this co-pending application, the sealing jaws were modified to provide relief in the areas of the bag having the thicker layers. An exemplary embodiment from this application is seen in cross-section in FIG. 4. In this drawing, the facings 400 have been relieved in sections A, C, and E of the bag 450, where the extra layers of the bag are present, so that a more even pressure is applied across the whole length of the seal. In the embodiment shown, the given areas of each facing were relieved by an amount equal to one thickness of the packaging material used. The edges of the relief areas do not form sharp corners, but are beveled approximately 45 degrees to allow for some slippage in the alignment of the material in the machine.

U.S. Pat. No. 6,230,781 to Smith addresses a hermetic seal in a different manner. A cross-section of the crimpers of Smith is seen in FIG. 5. These crimpers 500 are set up to provide a rocking motion as they seal, but otherwise do the same job and have many of the same problems as the crimpers discussed above. In order to address the varying number of layers of material to be sealed, Smith's crimpers incorporate an insert 510 of a resilient material on one side of the sealing area. The insert 510 has the form of a thick piece of rubberized material, stiffened with a core of metal 515. The resilient material, in contrast to an all-steel crimper, can provide some "give" to allow for extra layers of material.

It has long been considered desirable to reduce the number of leaking packages produced in the production line without increasing dwell time, even when the design of the package makes this more difficult.

SUMMARY OF THE INVENTION

In the disclosed crimpers, the areas that produce the leaks are given extra pressure by providing slightly raised areas on the surface of the facing. These raised areas target approximately ⅛ to ¼ inch to either side of problem areas. The raised areas are slight, approximately 1 to 30 mil, and more preferably 4 to 20 mil (i.e., 0.004–0.020 inches), for a film thickness of 2 to 4 mils (i.e., 0.002 to 0.004 inches) and can almost escape visual detection, but are sufficient to provide the necessary hermetic seal. The innovative crimpers provide the advantage of a simple, economical method of sealing areas that have previously been recalcitrant. The raised regions of the sealers can be the same material as the jaws or facings, i.e., steel, or they can be formed of a resilient material that provides some "give" during sealing. These regions can be formed integrally with the facings or they can be manufactured as inserts.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 3b shows a perspective of a prior art facing. FIG. 3b shows the top of a bag having both a fin seal and a cross-seal, captured between a pair of facings such as are shown in FIG. 3a and demonstrates the problems areas when sealing. FIGS. 3c–3f demonstrate the areas on such a bag where pinhole leaks tend to occur.

FIG. 4 shows sealing jaws, from a co-pending patent application, which address the problem of sealing across a varying number of layers of packaging material.

FIG. 6b shows a perspective of the modified crimper of FIG. 6a.

FIG. 8b shows a perspective of the modified crimper of FIG. 8a.

DETAILED DESCRIPTION

Several embodiments of the innovative invention will now be described with reference to FIGS. 6–8.

Figure 1A:
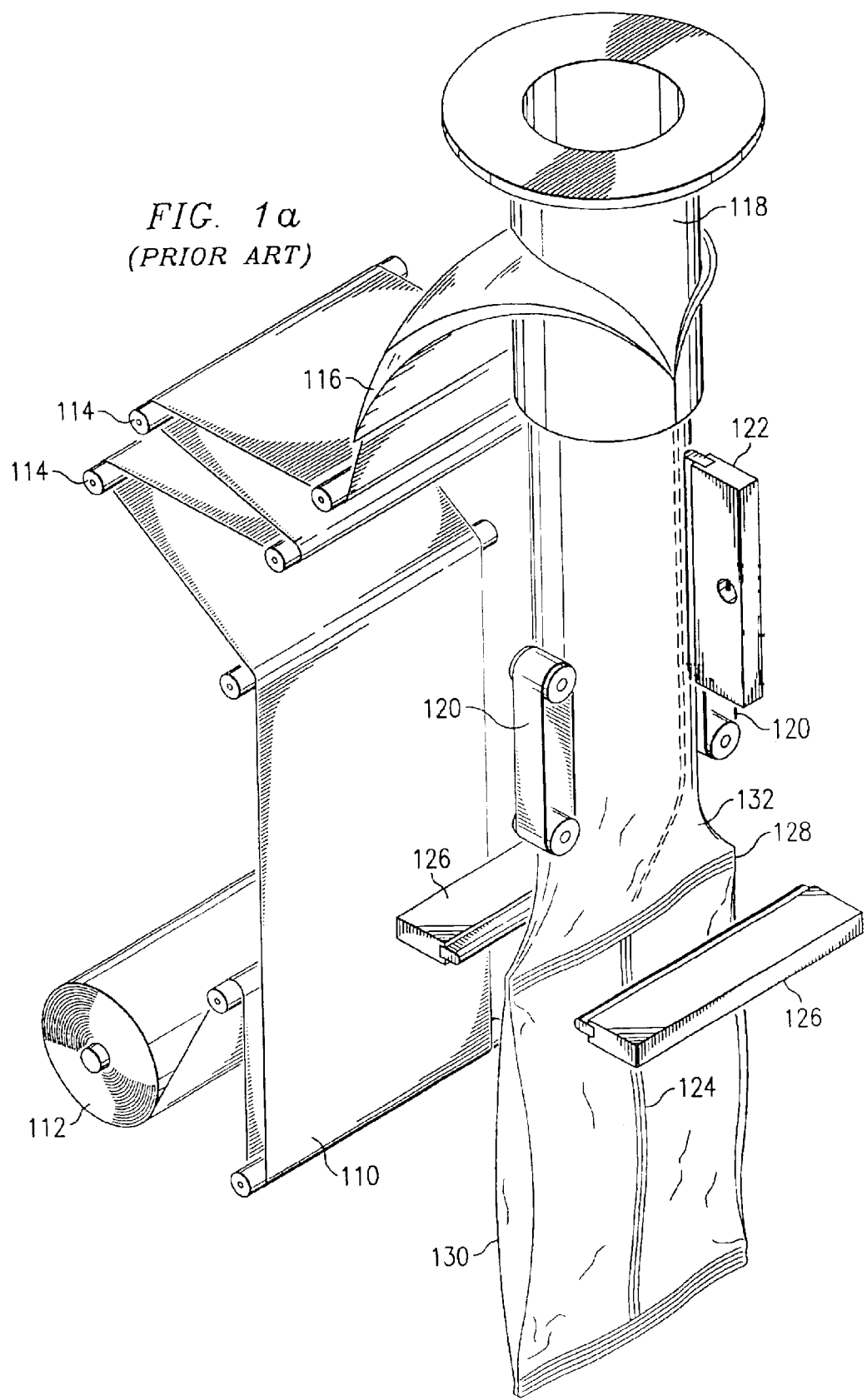
FIG. 1a is a diagrammatic view of a form, fill, and seal machine, known in the prior art.
Figure 1B:
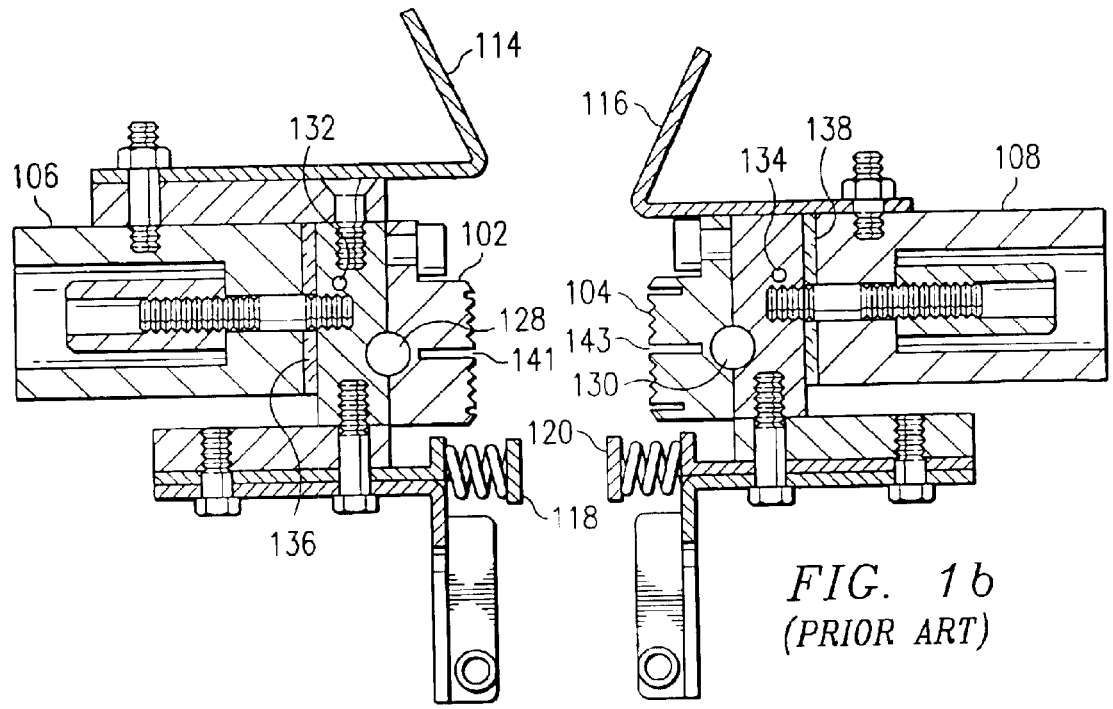
FIG. 1b is a cross-section and FIG. 1c is a perspective drawing, both of a sealing assembly from a form, fill, and seal machine.
Figure 2:
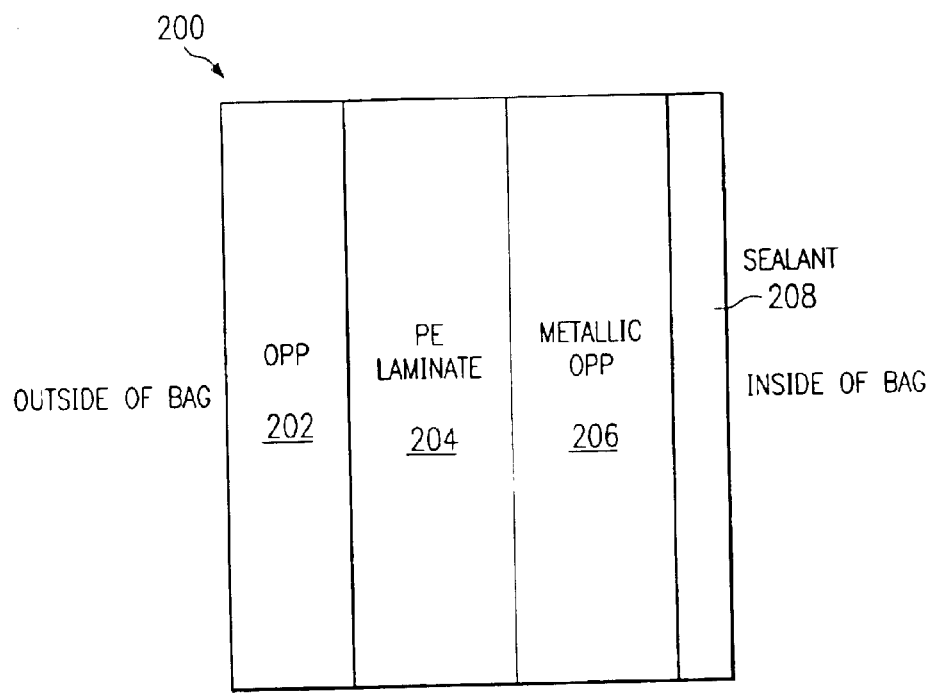
FIG. 2 shows the layers in a typical packaging material for snack foods.
Figure 1C:
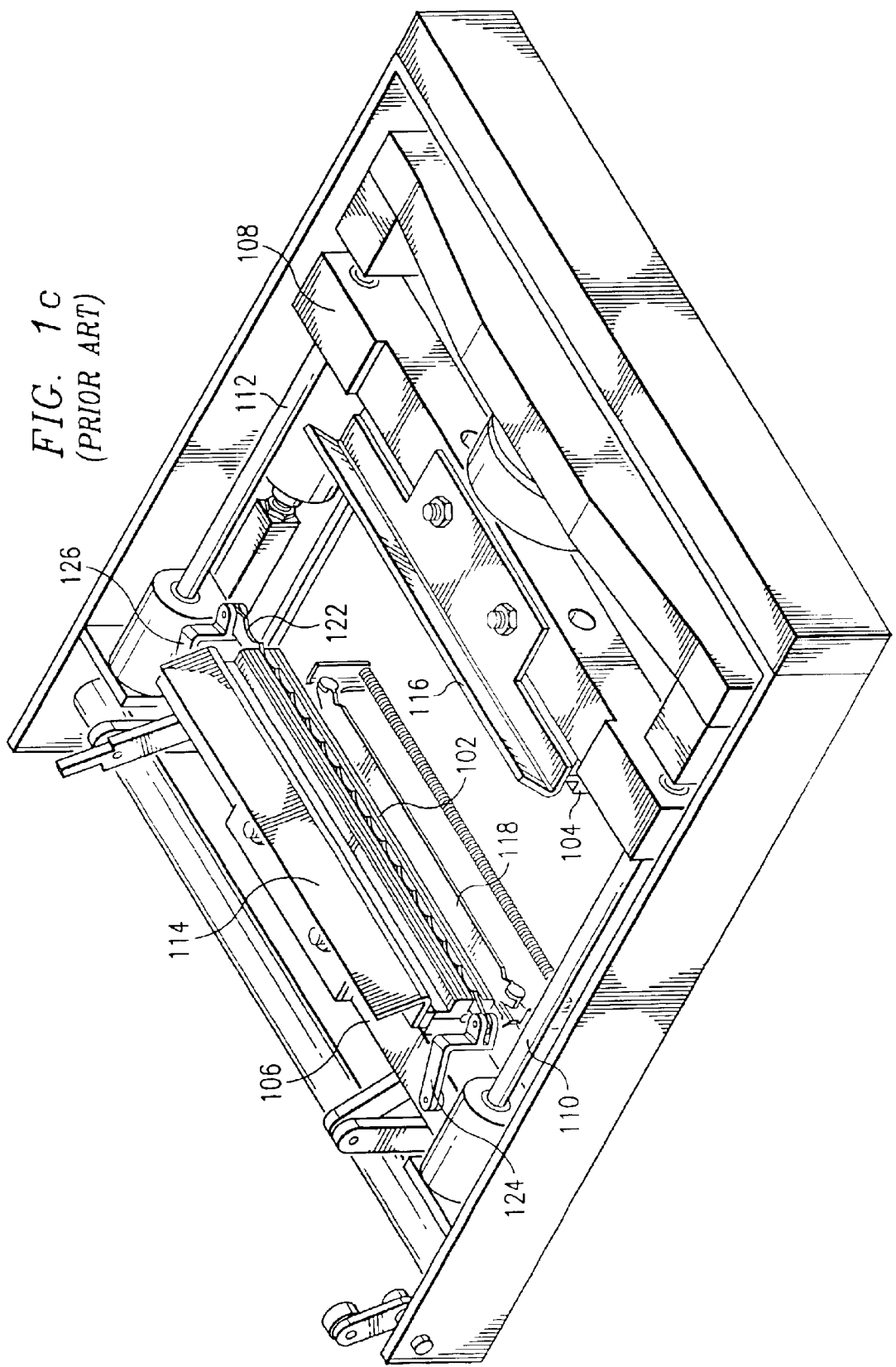
Figure 5:
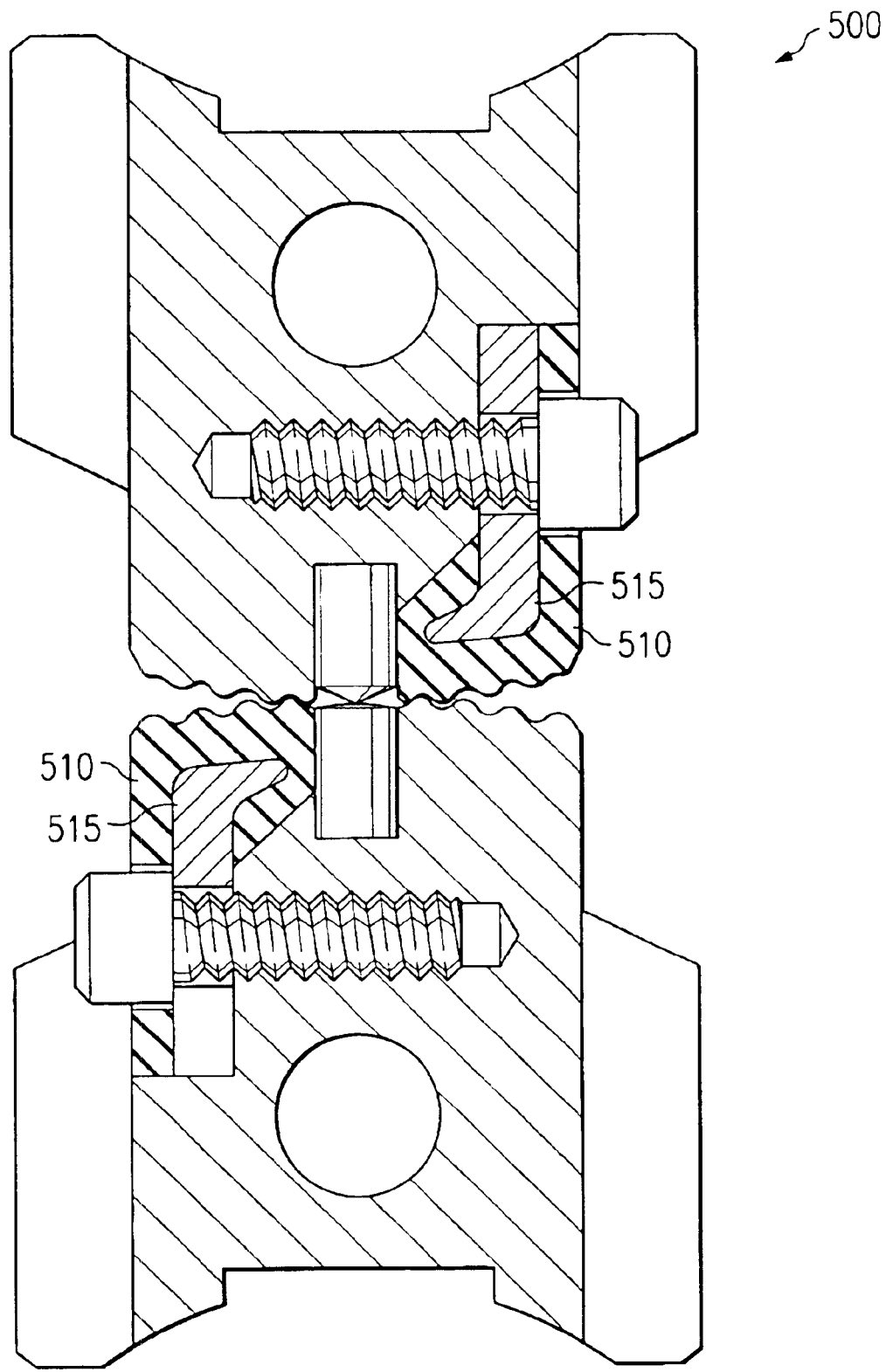
FIG. 5 shows a cross-section of the crimpers of Smith in U.S. Pat. No. 6,230,781.
Figure 6A:
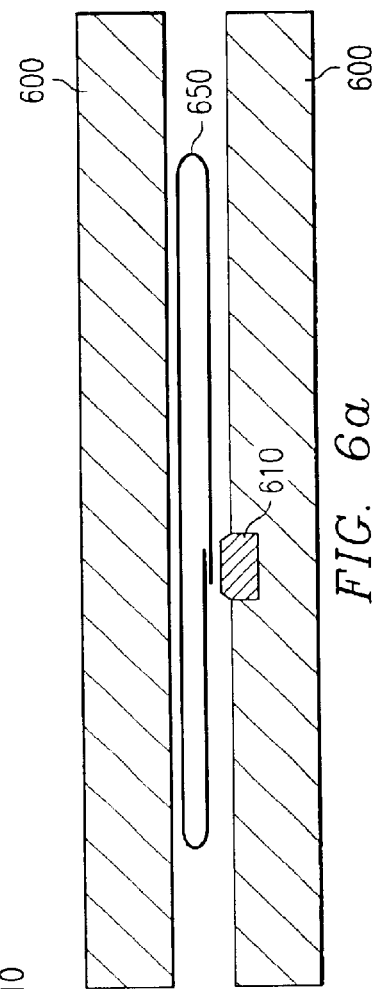
FIG. 6a shows a cross-section of a pair of crimpers designed to work with the bag shown, according to an embodiment of the present invention.
Figure 6B:
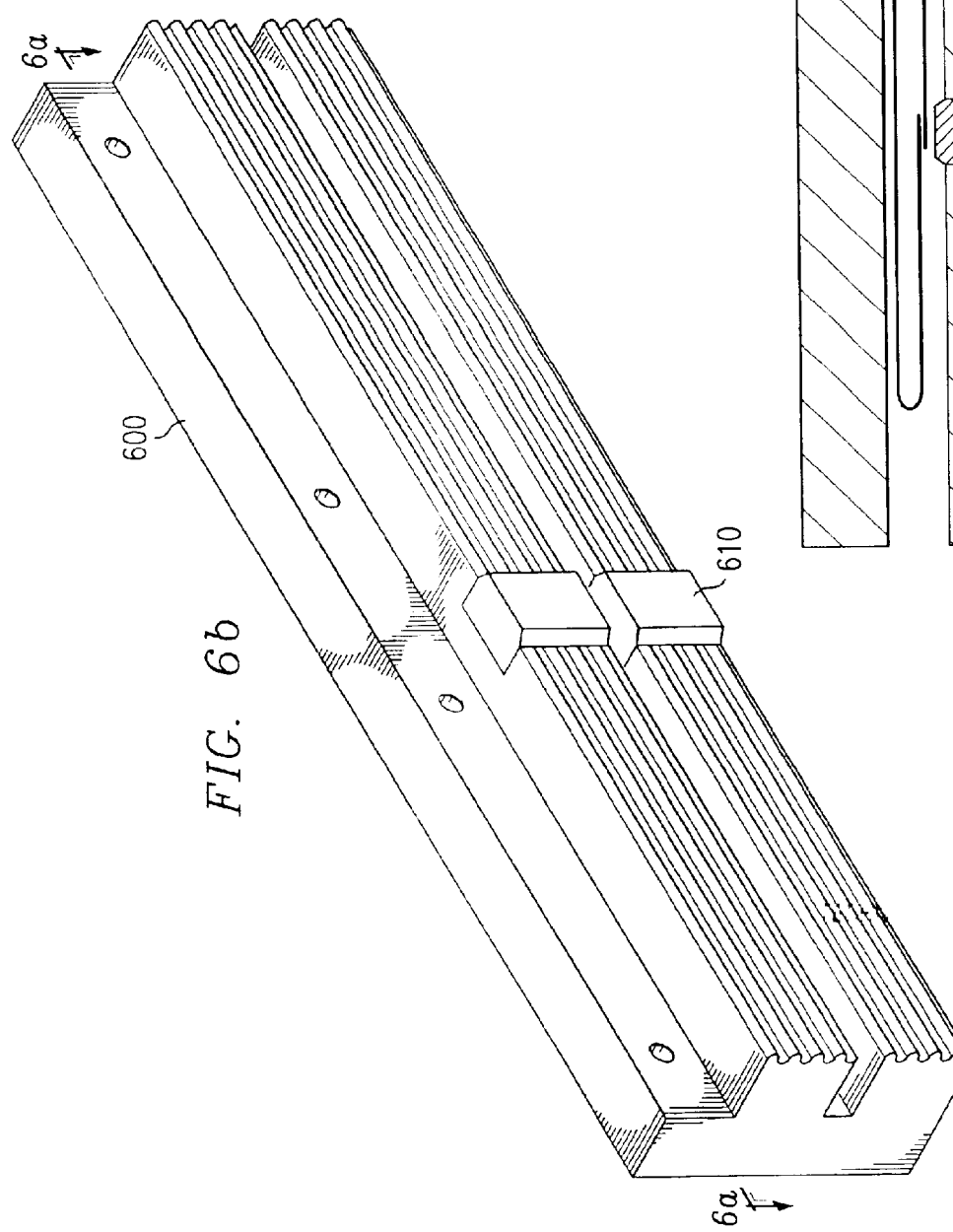

In a first embodiment, the bag to be formed has only a back lap seal, seen in FIG. 6a. A cross-section of one embodiment of the innovative jaws are shown positioned on either side of the bag 650. Here, the jaws 600 are formed entirely of steel, with the targeted area around the back seal being formed as an insert 610 to the rest of the facing. The targeted area on the facing has a thickness that is only 4 mils (i.e., 4 thousandths of an inch) thicker than the rest of the facing (note that these drawings are not to scale). This thickness is barely perceptible to the naked eye, but can be enough to provide a hermetic seal. With only one layer difference in the thickness across the seal, the use of more pressure over the back seal would not be necessary in all situations, but would be especially helpful when the packaging materials are thick. A perspective of this facing is seen in FIG. 6b.

Figure 7:
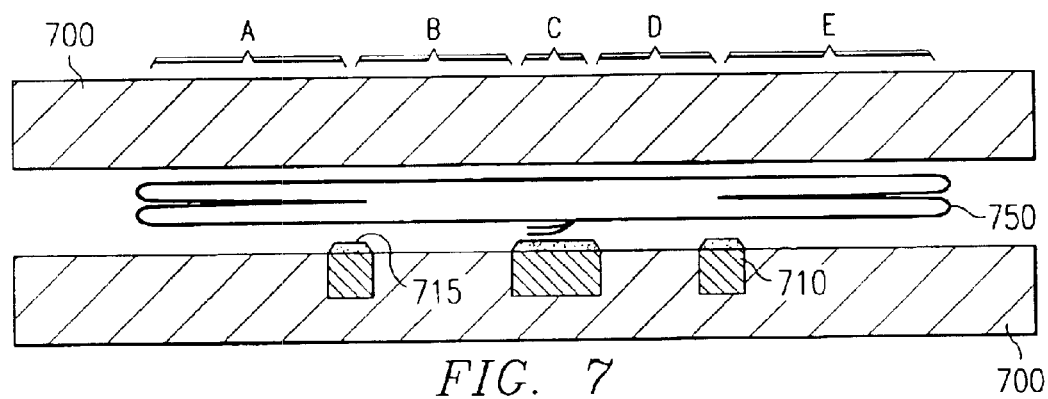
FIG. 7 shows a cross-section of a pair of crimpers designed to work with another bag, according to an alternate embodiment of the present invention.

In a second embodiment, FIG. 7 shows a set of crimpers designed to use with the bag 750 shown. In this embodiment, the bag 750 to be formed contains a fin seal, as well as deep pleats at each end of the bag, so that there are three areas A, C, E having four layers of material, while other areas B, D have only two layers. The lower crimper 700 has raised areas that correspond to the junction between regions A and B, between regions C and D, and between regions D and E. This embodiment of the crimpers 700 contains inserts 710 in the targeted areas, each insert having a surface layer 715 of a resilient material. The resilient material is composed of rubber, synthetic rubber, or similar material, has a thickness in the range of ⅛ to 1/16 inch, and is fastened to the rest of the insert by gluing.

Figure 8A:
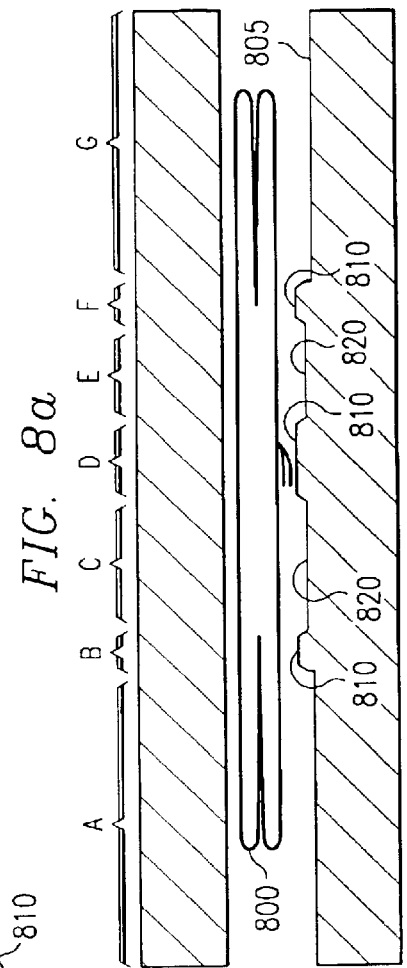
FIG. 8a shows a cross-section of an alternate pair of crimpers.
Figure 8B:
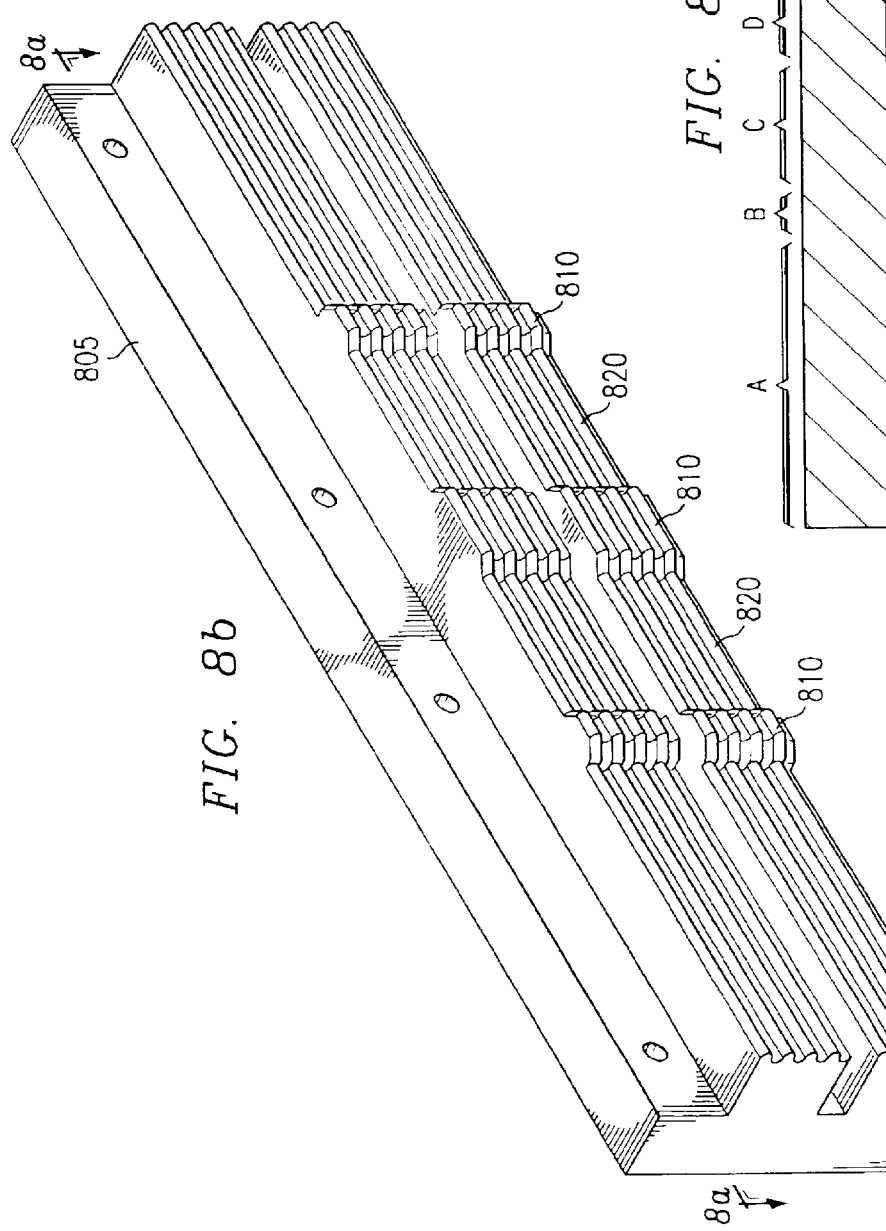

Given that the bag in FIG. 7 has large areas with four layers of material to be sealed, it can be desirable to provide an alternate embodiment, shown in FIG. 8a, especially if the packaging material is fairly thick. In this alternate embodiment, the surface of the crimper 800 occupies at least three levels. If we consider the sections C, E of the crimpers 800 that will contain only two layers to be the "normal" height for a bag of this thickness, the three sections B, D, F are raised to provide extra sealing power at the areas most likely to cause problems, i.e., where the number of layers changes. The areas A, C that contain four layers of material are relieved from the "normal" height in order that there be no bridging across the sections C, E having only two layers. To put it another way, sections 805 of the crimpers 800 are the farthest away from the upper crimper 800, section 820 is slightly closer to the opposite crimper, and sections 810 are the closest to the opposite crimpers 800. In this embodiment, the entire sealing surface is formed as a single piece having the raised and relieved portions integral with the other portions of the facing. A perspective of one of the crimpers 800 is shown in FIG. 8b.

Figure 9:
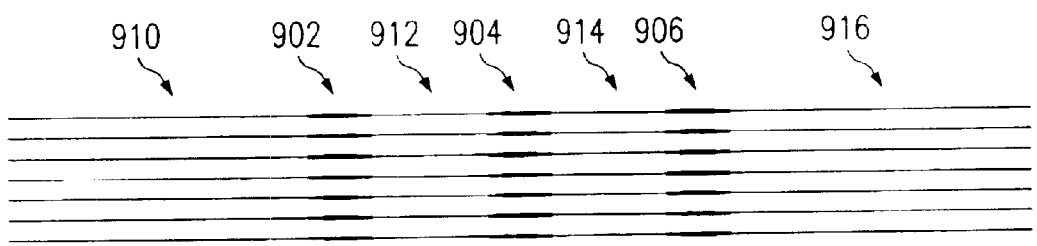
FIG. 9 shows the impression made on a sheet of pressure sensitive paper using the crimpers of FIG. 7.

FIG. 9 shows a tracing made by clamping a piece of pressure-sensitive paper in the jaws of FIG. 7. As seen in this figure, the areas of the paper 902, 904, 906 that correspond to the raised sections of the facing received a greater percentage of the available pressure. Adjacent regions 910, 912, 914, 916 will receive somewhat less than they would receive using a prior art facing, but still sufficient to provide consistent sealing in these non-critical areas. In testing using the inventive sealing jaws, this configuration has been found to improve sealing in the problem areas. The exact amount of improvement would depend on the design of the bag, the materials used in its manufacture, and the specific embodiment of the innovative facings.

What is claimed is:

1. A method of forming a bag containing a product, said method comprising the steps of:

sealing first and second edges of a sheet of packaging material to each other along the length of said sheet;

bringing a first jaw having a first seal facing surface having a raised level at a first region and a second jaw having a second seal facing surface together to make a first seal that is substantially perpendicular to said first and second edges, thereby creating an open bag;

placing a product into said open bag; and bringing said first and said second jaws together to make a second seal that is substantially parallel to said first seal to create a sealed bag containing a product;

wherein said steps of bringing said first and second jaws together applies a greater pressure via said raised level to said first region of said first and second seal having more than two layers than is applied to a second region of said first and second seal having only two layers.

2. The method of claim 1, further comprising the step of heating said first and said second jaws.

3. The method of claim 1, wherein said raised level of said first facing surface is raised approximately 1–30 mils from said first level of said first facing surface.

4. The method of claim 1, wherein said raised level of said first facing surface is raised approximately 4–20 mils from said first level of said first facing surface.

5. The method of claim 1, wherein a region containing said raised level is formed integrally with a region containing said first level of said first facing surface.

6. The method of claim 1, wherein a region containing said raised level is formed as an insert to a region containing said first level of said first facing surface.

7. The method of claim 1, wherein a region containing said raised level is formed from the same material as a region containing said first level of said first facing surface.

8. The method of claim 1, wherein a region containing said raised level comprises a resilient material.

9. The method of claim 8, wherein said resilient material comprises a rubber, synthetic rubber, or similar material.

* * * * *